Dec. 12, 1950  C. C. FUERST  2,533,450
IMPACT LATCH TO PREVENT REBOUND IN
CAMERA SHUTTER LEAVES
Filed Dec. 20, 1949
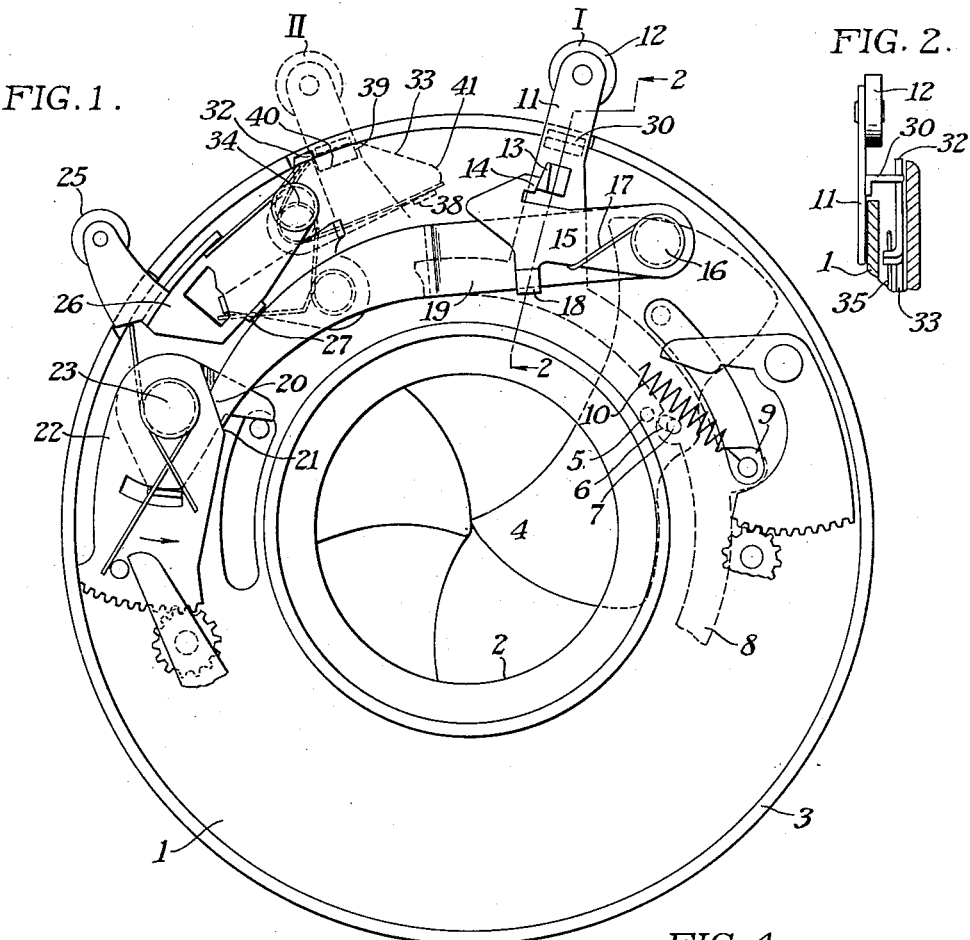
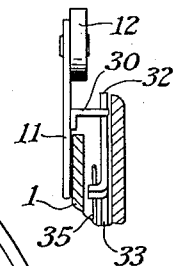
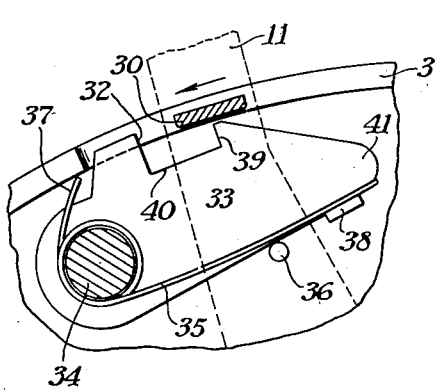
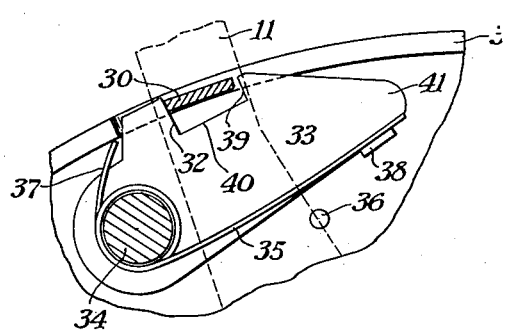
CARL C. FUERST
INVENTOR
BY Daniel J. Mayne
Donald H. Stewart
ATTORNEYS Patented Dec. 12, 1950

2,533,450

UNITED STATES PATENT OFFICE 2,533,450

IMPACT LATCH TO PREVENT REBOUND IN CAMERA SHUTTER LEAVES

Carl C. Fuerst, Rochester, N. Y., assignor to Eastman Kodak Company, Rochester, N. Y., a corporation of New Jersey Application December 20, 1949, Serial No. 133,985

5 Claims. (Cl. 95—63)

This invention relates to photography and more particularly to a means for preventing rebound of shutter blades in camera shutters. One object of my invention is to provide a simple type of rebound prevention means which can be readily applied to various types of camera shutters. Another object of my invention is to provide a means for preventing rebound which does not require any special mechanism to release a latch which momentarily latches the shutter leaves against movement. A still further object of my invention is to provide a rebound mechanism which is entirely automatic in its operation, and which does not impose any resistance on the means for setting the shutter master member. Other objects will appear from the following specification, the novel features being particularly pointed out in the claims at the end thereof.

While my improved shutter rebound prevention device may be attached to many different known types of shutters, in the drawing I have shown a preferred embodiment wherein it forms a part of a shutter of the type shown in my copending application Serial No. 728,528, Direct Acting Shutter, filed February 14, 1947, now Patent No. 2,524,786, dated October 10, 1950. Reference may be had to this application for a more complete showing of the shutter parts which are not important as to the present invention.

Coming now to the drawings wherein like reference characters denote like parts throughout:

Fig. 1 is a fragmentary view of a shutter with the shutter cover and upper plate removed, showing my improved shutter rebound prevention device. This view is a top plan view of the shutter with certain parts removed for clearness;

Fig. 2 is a fragmentary sectional view taken on line 2—2 of Fig. 1;

Fig. 3 is an enlarged top plan view of an impact latch shown in its normal position of rest with the master member approaching its rest position in making an exposure; and Fig. 4 is a view similar to Fig. 3, but with the latch in latching position with respect to a protuberance on the master member.

In shutters which include rapidly moving parts, it is sometimes difficult to prevent the impact of the parts suddenly coming to rest after an exposure from reacting on the shutter blades tending to cause the blades to partially, or completely open, after the exposure has been completed. Usually, the difficulties are the greatest at the higher speeds, and usually the overlap of the shutter leaves takes care of any actual opening between the shutter leaves, but sometimes they may partially open a sufficient distance to mar the negative by admitting unwanted light. In the past, a number of different arrangements have been designed to overcome such difficulties; one of the most pertinent being shown in U. S. Pat. No. 2,172,295, "Setting Shutter Leaf Rebound Latch," W. A. Riddell, granted September 5, 1939. My present invention may be considered as an improvement over the structure shown in the Riddell patent. In most of the known rebound prevention devices, the shutter leaves have been latched by a latch member which requires releasing, by some means or other, such as in the Riddell patent, by a lug on the latch which operates the shutter blades. In other known types of devices some inertia object, such as a lever, link, or weight, is moved against friction to absorb the shock of parts rapidly coming to rest, but in such devices it is difficult to maintain the required degree of friction to produce the best results. In my improved form of rebound prevention device, I have provided what I call an impact latch in that there is a latch member normally held out of a latching position but momentarily driven into a latching position by means of the impact of the master member coming to rest. Thus, a portion of the impact may be taken up in moving the latch member to a latching position, but such a latch is very desirable because no releasing is necessary. A spring normally holds the latch in its released position so that no added burden is imposed on an operator setting the shutter and no more force is required to set the shutter than if the latch were not present at all.

In the preferred embodiment of my invention, the shutter may consist of the usual casing 1 having an exposure aperture 2 in the center and an upstanding flange 3 around the periphery, inside of which the shutter mechanism is placed to be covered by the shutter cover, as is well known. The exposure aperture 2 is normally covered by a number of shutter leaves 4. In the present instance, the shutter leaves 4 are of the double-ended variety, which move in one direction only in opening and closing the shutter aperture 2. The shutter leaves may be pivoted on studs 5 carried by the shutter. Pins 7 passing through slots 6 in blade ring 8 pivotally connect the blades 4 to ring 8 which ring forms the blade ring and master member. This ring 8 carries an outwardly extending ear 9 to which one end of a power spring 10 is attached; the other end being attached near the flange 3, but being omitted from Fig. 1 to better show the parts lying beneath the spring.

The ring 8 carries an outwardly extending arm 11 having a handle 12 for setting the shutter. The setting arm or lever carries a lug 13 which may be engaged by the end 14 of a latch 15; this latch being pivoted on a stud 16 and held by a spring 17 in the position shown with a lug 18 engaging the power release lever 19 also pivoted on stud 16. Lever 19 includes a cam face 20 engaging the cam 21 of the power-operated release member 22. This member is carried on a pivot 23 and when this member turns in a counterclockwise direction, the lever 19 will be moved to release the latch elements 13 and 14 to make an exposure, providing the lever 19 is first moved past its substantially dead-center position with respect to pivots 23 and 16 by means of a trigger 25. This is accomplished by pushing a lever 25 downwardly, moving a lever 26 inwardly and moving the lug 27 downwardly to start the lever 19 moving. After this movement is started an insufficient distance to release the latch elements 13 and 14, the spring-driven member 22 takes over and completes the releasing movement of the lever 19 through the cam surfaces 21 and 20. As thus far described, the construction is the same as that of my copending application above referred to.

In order to prevent rebound of the master member coming to rest, the master member arm 11 has been provided with a downwardly extending protuberance 30 which moves with the arm 11 through an arcuate path from the fully set position shown at I to the rest position shown in dotted lines at II. Referring to Figs. 3 and 4, the protuberance 30 moves through a path which will bring it up against an impact shoulder 32 on an impact lever 33. This is a simple pivoted lever supported on a stud 34 and having a spring 35 turning the lever in a clockwise direction and into a normal rest position against a pin 36. One end 37 of the spring may press on the upwardly extending flange 3 of the shutter, and the other end may press against a lug 38 on the outer end of the lever. Opposite the impact surface 32 there is a latching surface 39, these two surfaces or shoulders being connected by a recess 40. The end 41 of the lever is extended away from the pivot 34 a distance greater than either of the shoulders 32 or 39 to provide inertia in the lever.

Since the shoulder 32 is offset from the pivot 34 in a generally radial direction, when the protuberance 30 strikes the impact surface 32, the lever 33 is swung against the pressure of spring 35 until the latching shoulder 39 is swung behind the protuberance 30, as shown in Fig. 4. This occurs momentarily as the master member comes to rest and the spring 35 may be insufficient to overcome the force of the protuberance against the impact shoulder 32. It will therefore remain in the Fig. 4 position until the setting lever 12 is moved from its rest towards its set position. As this movement starts, the lever 33 immediately turns in a clockwise direction, keeping the impact edge 32 in engagement with the protuberance 30 until the lever 33 comes to its rest position against the stop pin 36. Therefore, the spring 35 does not impose any added torque in setting the shutter, but, in fact, very slightly assists in starting the setting movement. Moreover, the latch 33 is always in a rest position in which the latching shoulder 39 is out of the path of movement of the protuberance 30 and only moves into that path when the lever 33 is moved by the protuberance 30 striking it at the end of an exposure-making movement.

This form of impact lever has many advantages, among which are that no specific releasing mechanism which requires timing or contact between other shutter parts is required, since the spring 35 automatically releases the impact latch as the shutter-setting movement starts. The latch also acts as a weight to partially absorb the shock of the master member coming to rest after an exposure, whether or not the latching shoulder 39 stops a rebound movement. The rebound latch requires only two extra parts; that is, the latch itself and the spring for normally holding the latching shoulder in an inoperative position while the impact shoulder always lies in the path of the protuberance. The weight of the arm, due to the arm extension, is such that the latch arm is able to move behind the protuberance to latch it before the protuberance can rebound from the impact shoulder. Still further, this construction is useful because no close tolerances between the impact shoulder, the latching shoulder, and the protuberance are required for satisfactory operation.

It has been found that the impact latch has worked satisfactorily throughout the complete range of exposures shown in my copending application, although, of course, the rebound is liable to be greatest at the highest speed of $1/800$ of a second, because at that speed the master member is being driven steadily throughout its range of movement at the greatest speed that can be obtained with this shutter.

It is obvious that this type of rebound latch may be applied to many other shutters, whether they are provided with extreme high speeds or not, since it is a simple matter to place such a rebound latch in the path of a lug on a master member which moves in only one direction in making an exposure. It will thus be seen that I have provided a device in which the several objects of the invention are achieved, and which is well adapted to meet conditions of practical use.

As various possible embodiments may readily be made, and as various changes may also be made in the embodiment above set forth, it is to be understood that all the matter herein set forth, or shown in the accompanying drawings, is to be interpreted as illustrative only and not in a limiting sense.

Having thus described my invention, what I claim as new and desire to secure by Letters Patent of the United States is:

1. A shutter leaf rebound prevention device for camera shutters of the type including an apertured casing, a blade pivotally mounted to move from an operative position over the aperture to an inoperative position away from the aperture, a master member having a protuberance and releasably engaged by a release lever, a spring for driving the master member in one direction, operable connections between the master member and the shutter blade for moving the latter by the former, the combination with said master member, of a protuberance carried thereby through an arcuate path from a rest to a set position, said rebound prevention device comprising a pivoted lever adjacent the arcuate path of the protuberance in its rest position, an impact shoulder normally lying in the path of the protuberance, and a latching shoulder normally lying out of the path of the protuberance but movable to a latching position by the protuberance striking the impact shoulder and a spring normally tending to move the latching shoulder from the path of the protuberance.

2. The shutter leaf rebound prevention device of claim 1 characterized by the impact shoulder and latching shoulders being separated a distance greater than the length of the protuberance.

3. The shutter leaf rebound device of claim 1 characterized in that the master member includes an arm extending out through the casing for setting the master member and in which the protuberance is mounted on the arm.

4. The shutter leaf rebound device of claim 1 characterized in that the master member is a ring-shaped member extending around the shutter aperture and including an arm extending out through the casing for setting the master member, the protuberance being carried by the arm, and the pivoted lever being pivoted at one end and extending approximately tangent to the arcuate path of movement of the protuberance.

5. The shutter leaf rebound device of claim 1 characterized in that the master member is a ring-shaped member extending around the shutter aperture and including an arm extending out through the casing for setting the master member, the protuberance being carried by the arm, and the pivoted lever being pivoted at one end and extending approximately tangent to the arcuate path of movement of the protuberance, said impact shoulder being offset from the pivot whereby the protuberance in striking the impact shoulder may swing the arm to position the latching shoulder on the opposite side of protuberance from that side of the protuberance striking the impact shoulder to prevent rebound of the master member.

CARL C. FUERST.

No references cited.